(12) United States Patent
English et al.

(10) Patent No.: US 8,228,645 B2
(45) Date of Patent: Jul. 24, 2012

(54) SYSTEMS AND METHODS FOR PROTECTING A SERIES CAPACITOR BANK

(75) Inventors: Bruce Edward English, Saratoga Springs, NY (US); Christopher William Hart, Rexford, NY (US); Paul Joseph Datka, Ballston Spa, NY (US); David Scott Birrell, Cummington, MA (US); David Martins, Saratoga Springs, NY (US); Robert Frank Willard, Jr., Burnt Hills, NY (US); Kenneth Alan Powers, Roanoke, VA (US); Richard Robert Young, Granville, NY (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 12/396,925

(22) Filed: Mar. 3, 2009

(65) Prior Publication Data

US 2010/0226049 A1    Sep. 9, 2010

(51) Int. Cl.
*H02H 7/16* (2006.01)
*H02J 7/00* (2006.01)
*H02J 3/00* (2006.01)

(52) U.S. Cl. ............... 361/15; 320/166; 307/109

(58) Field of Classification Search ............ 361/15, 361/16, 56; 315/37, 352, 127, 129, 16, 15
See application file for complete search history.

(56) References Cited

U.S. PATENT DOCUMENTS

| | | | |
|---|---|---|---|
| 3,497,764 A | 2/1970 | Smith, Jr. | |
| 3,576,458 A | 4/1971 | Smith, Jr. | |
| 3,619,721 A * | 11/1971 | Westendorp | ............ 361/16 |
| 3,973,169 A | 8/1976 | Titus | |
| 4,131,826 A | 12/1978 | Harris | |
| 5,510,942 A | 4/1996 | Bock | |

* cited by examiner

*Primary Examiner* — Rexford N Barnie
*Assistant Examiner* — Angela Brooks
(74) *Attorney, Agent, or Firm* — Sutherland Asbill & Brennan LLP

(57) ABSTRACT

Systems and methods for protecting a series capacitor bank are provided. According to one exemplary embodiment of the invention, there is disclosed a capacitor protection circuit. The capacitor protection circuit may include a capacitor bank, a pilot circuit and a main commutation gap. The pilot circuit and the main commutation gap may be provided in parallel electrical communication with the capacitor bank. Additionally, one or more plasma injectors may be provided in series electrical communication with the pilot circuit. The plasma injectors may be operable to provide partially or completely ionized plasma across the main commutation gap to make conductive the main commutation gap.

20 Claims, 3 Drawing Sheets

SYSTEMS AND METHODS FOR PROTECTING A SERIES CAPACITOR BANK

FIELD OF THE INVENTION

This invention relates generally to power transmission lines and more specifically relates to providing systems and methods for protecting a series capacitor bank.

BACKGROUND OF THE INVENTION

Series capacitor banks are used to enhance both the steady state and dynamic power transmission capacity of overhead power transmission lines by compensating the inductive reactance of the line.

The use of a capacitor bank in series electrical connection (also interchangeably referred to herein as "electrical communication") with the power transmission line makes the capacitor bank sensitive to the faults on the power transmission line. Various techniques are employed to protect the capacitor bank from an over-voltage condition. These techniques include use of a Metal Oxide Varistor, (MOV) which is susceptible to sustained overload conditions when the current and/or energy absorption exceeds its rated capacity. Traditionally, a non-conductive triggered (or triggerable) or untriggered gap switch that has a high voltage and a high current rating is connected in parallel with the MOV and the capacitor bank to withstand simultaneously a fault current in the power transmission line and discharge current from the capacitor bank, and also to quickly bypass both the MOV and the capacitor bank in order to limit the time that both are exposed to the system fault. Note that "triggering" refers to the act of turning a non-conductive gap into a gap that is conducting current effectively creating a fast closing switch that does not require overcoming the inertia of movable switch contacts. The non-conductive gap functions as a fast-bypass device for the MOV and the capacitor bank by providing a parallel circuit for the fault currents and simultaneously allowing the capacitor bank to safely discharge.

Traditional designs of this non-conductive gap combine the high-voltage dielectric withstand requirements of the non-triggered, non-conducting gap with the high-current fault plus discharge current requirements of the triggered, conducting gap into a single component capable of both sets of requirements. This combination of requirements into just one component may be expensive in terms of cost, complexity of design, and unreliability.

Accordingly, there is need for a reliable technique that can handle high voltage and high current overloads efficiently and economically. There is further a need for systems and methods for protecting a series capacitor bank.

BRIEF DESCRIPTION OF THE INVENTION

According to one exemplary embodiment of the invention, there is disclosed a capacitor protection circuit. The capacitor protection circuit may include a capacitor bank, a pilot circuit, and a main commutation gap. The pilot circuit and the main commutation gap may be provided in parallel electrical communication with the capacitor bank. Additionally, one or more plasma injectors may be provided in series electrical communication with the main commutation gap. The plasma injectors may be operable to provide partially or completely ionized plasma across the main commutation gap to make a conductive path across the main commutation gap.

According to another exemplary embodiment of the invention, there is disclosed a method for discharging a capacitor bank. The method may include a step of delivering a current through a pilot circuit, wherein the pilot circuit may be provided in parallel electrical communication with the capacitor bank. The method may further include a step of delivering the current through one or more plasma injectors that may be provided in series electrical communication with the pilot circuit. The plasma injectors may be operable to dielectrically break down a main commutation gap in parallel electrical communication with the pilot circuit and the capacitor bank. The method may also include increasing impedance in series with the pilot circuit and simultaneously increasing the current flow through the main commutation gap and decreasing the current flow through the pilot circuit in response to the increased impedance in series with the pilot circuit.

According to yet another exemplary embodiment of the invention, a power transmission line is described. The power transmission line may include a power source and a load in electrical communication with the power source by the power transmission line. A capacitor bank may be provided in series electrical communication with the power source and load. A pilot circuit and a main commutation gap may be provided in a parallel electrical communication with the capacitor bank. Additionally, one or more plasma injectors may be provided in series electrical communication with the pilot circuit. The plasma injectors may be operable to provide partially or completely ionized plasma across the main commutation gap to dielectrically breakdown the main commutation gap.

Other embodiments, aspects, and features of the invention will become apparent to those skilled in the art from the following detailed description, the accompanying drawings, and the appended claims.

BRIEF DESCRIPTION OF THE DRAWINGS

Figure 1:
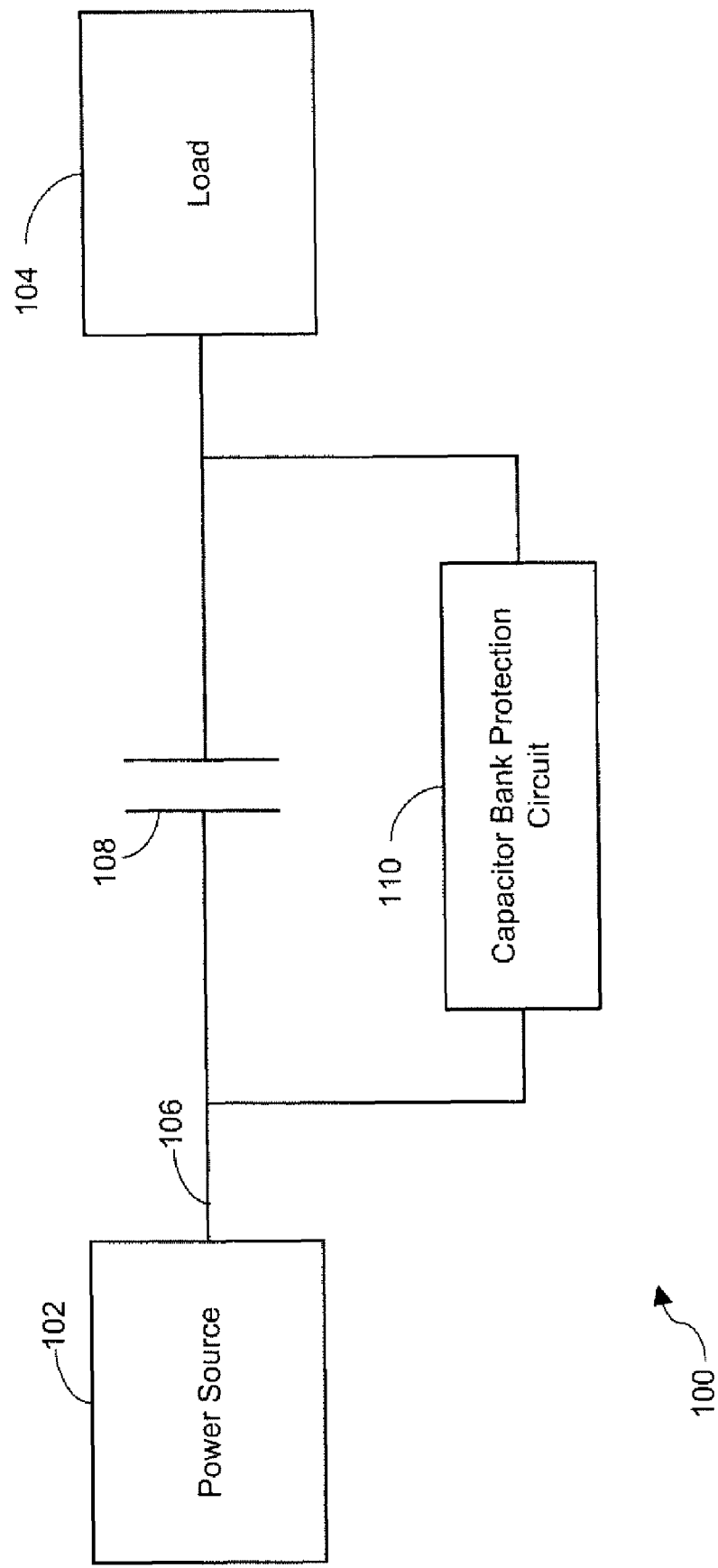

Having thus described embodiments the invention in general terms, reference will now be made to the accompanying drawings, which are not necessarily drawn to scale, and wherein:

FIG. 1 is a block diagram of an example power transmission system, in which an embodiment of the invention may be utilized.

Figure 2:
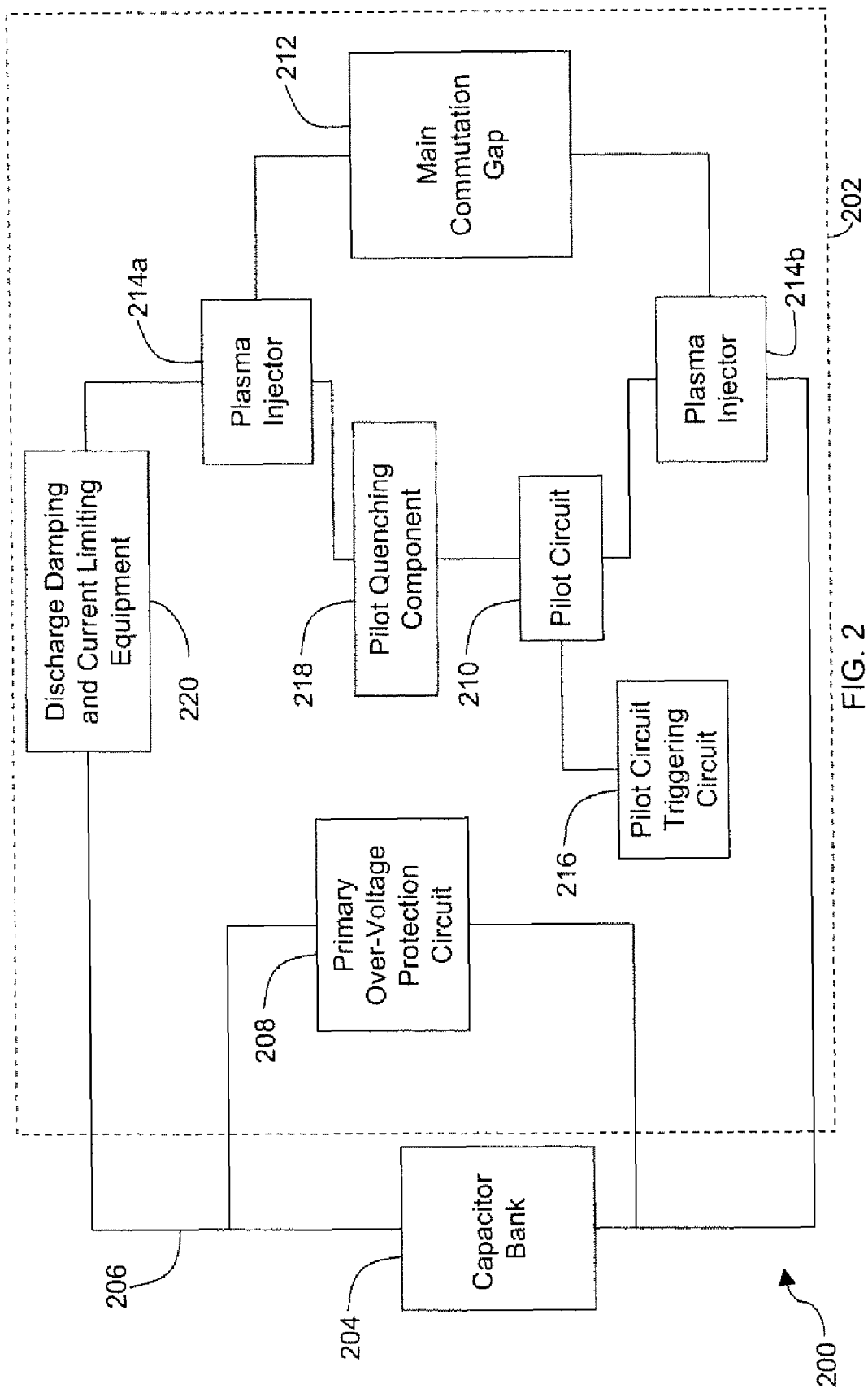

FIG. 2 is a block diagram illustrating an example circuit for protection of a capacitor bank, in accordance with an embodiment of the invention.

Figure 3:
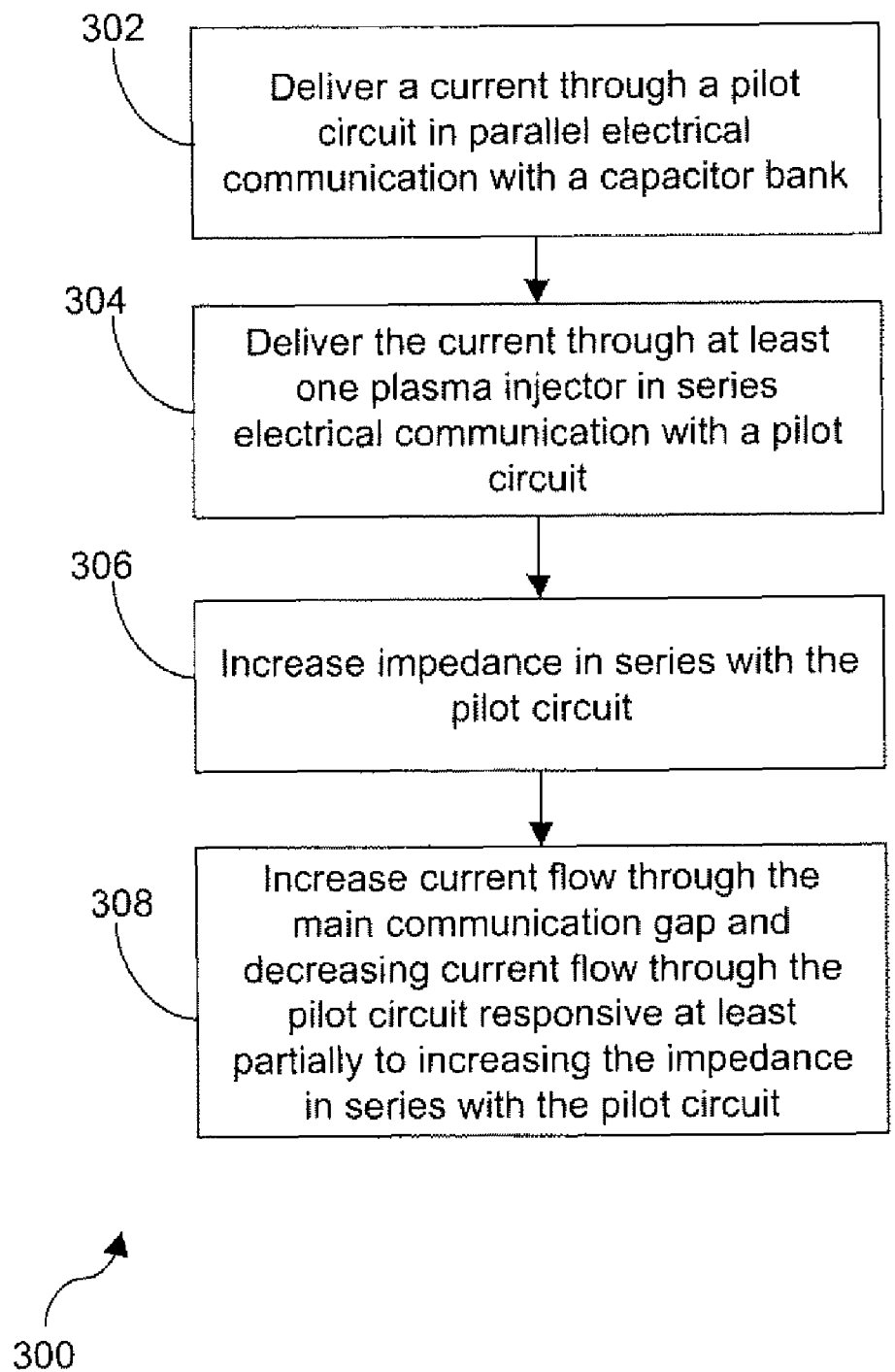

FIG. 3 is a flowchart illustrating an example method for discharging a capacitor bank, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for protecting a capacitor bank and providing a capacitor bank protection circuit. The capacitor bank protection circuit may include a pilot circuit having high voltage capabilities and a main commutation gap having high voltage and high current carrying capabilities. The main commutation gap may be provided in a parallel connection with the pilot circuit. According to an embodiment of the invention, one or more plasma injectors may be provided in a series connection with the pilot circuit. The plasma injectors may allow the flow of current to shift from the pilot circuit to the main commutation gap, which may have low impedance relative to the pilot circuit.

FIG. 1 is a block diagram of a power transmission system 100 in which an example embodiment of the invention may be utilized. FIG. 1 illustrates a power source 102 connected to a load 104 through a power transmission line 106. The power source 102 uses the power transmission line 106 to supply electrical power to the load 104. Further, a capacitor bank 108 is provided in series electrical communication with the power transmission line 106. The capacitor bank 108 compensates for the inductance of the power transmission line 106 and thus improves the power transfer capabilities of the power transmission system 100.

In example embodiments, the power transmission line 106 may be an overhead Alternating Current (AC) power transmission line with typical spans of between 50 miles and 300 miles, according to some embodiments; though according to other embodiments, an overhead AC power transmission line may span greater than 300 miles. The power transmission line 106 may be used between high voltage buses and for transmission at voltages in a range of 4.2 kV to 800 kV, according to some embodiments; though according to other embodiments, the power transmission line 106 may be used for transmission at voltages greater than 800 kV. In example embodiments, the power transmission line may be supplied with an AC power that ranges between 50 MW to 5000 MW. The use and applicability of the power transmission line 106 is not limited to the specifications provided above; it can also be used between a power generation facility and an electrical sub-station or between two electrical sub-stations, for example.

The power transmission system 100 also includes a capacitor bank protection circuit 110 to protect the capacitor bank 108 during an over-voltage condition, which may occur due to a fault on the power transmission line 106. The capacitor bank protection circuit 110 is provided in parallel electrical communication with the capacitor bank 108. Typically, the capacitor bank protection circuit 110 may be a non-conductive gap device or a non-conductive gap device with a Metal Oxide Varistor (MOV), or a power electronics based non-conductive gap device with a MOV, or a combination of these devices. The non-conductive gap device is hereinafter referred to as a pilot circuit. The pilot circuit may include a small air gap, a vacuum gap, a gap using a gas for example $SF_6$ (Sulphur hexafluoride), a power electronics based device, or any other type of high dielectric and high voltage triggered bypass device. The specific design of the above described capacitor protection circuit 110 may vary based on the size of the capacitor bank 108 and capabilities of power transmission line 106.

In one example embodiment, the power transmission system 100 may include a primary over-voltage protection circuit in parallel electrical communication with the capacitor bank 108. The primary over-voltage protection circuit may include a MOV, which may become conductive when the voltage across the capacitor bank 108 reaches a threshold voltage. The threshold voltage may be predetermined based on the rated capacity of the capacitor bank 108, which may vary based on use, design, circuit constraints, and the like. As a result, the MOV absorbs an energy released from the generated current due to the fault in the power transmission line 106 and thus protects the capacitor bank 108 from the over-voltage condition.

However, damage may occur to the MOV if the energy released due to the fault in the power transmission line 106 approaches or exceeds the rated capacity of the MOV. In order to protect the MOV, the pilot circuit is provided in parallel electrical communication with the capacitor bank 108 and the primary over-voltage protection circuit. The primary over-voltage protection circuit may also trigger the pilot circuit in case of overload at the MOV.

The pilot circuit can be designed to handle both high voltage demands of the non-conducting, not-triggered gap condition, plus the high current demands of the conducting, triggered gap condition during the fault in the power transmission line 106 and discharge of the capacitor bank 108. Therefore, pilot circuit designs in such a case may be very complex and expensive. Additionally, a sustained current in the pilot circuit may lead to excessive heating of the pilot circuit, which may increase the dielectric recovery time of the pilot circuit. In view of the above limitations, embodiments of the invention provide a capacitor bank protection circuit that can separately handle high current and high voltage requirements with separate components, plus limit the intensity and/or duration of the current conduction through the pilot circuit, and thus protect the capacitor bank 108, as well as improve/decrease the dielectric recovery time of the pilot circuit, as is described in detail with reference to FIG. 2.

FIG. 2 is a block diagram 200 illustrating an example capacitor bank protection circuit 202, in accordance with an illustrative embodiment of the invention. FIG. 2 illustrates a capacitor bank 204 on a power transmission line 206 in a series connection with a load (as shown in FIG. 1) and an AC power source (as shown in FIG. 1). In an example embodiment, the capacitor protection circuit 202 is provided to protect a capacitor bank 204 during and after a fault in a power transmission line 206. The capacitor bank protection circuit 202 includes a primary over-voltage protection circuit 208 and a pilot circuit 210. The primary over-voltage protection circuit 208 and the pilot circuit 210 are provided in parallel connections with the capacitor bank 204. Further, a main commutation gap 212 is provided in a parallel connection with the pilot circuit 210 and the capacitor bank 204 that has greater dielectric capability than the pilot circuit and is therefore more difficult to trigger or make conductive than the pilot circuit. Further, the capacitor bank protection circuit 202 also includes one or more plasma injectors 214a and 214b connected in series with the pilot circuit 210. These injector(s) utilize a portion of the energy contained in the charged capacitor bank and the transmission system fault to generate ionized plasma when the pilot circuit is triggered. This large pool of energy makes it possible for the plasma injector(s) to trigger the main commutation gap 212, whereas conventional gap triggering methods would be unable to trigger this gap. In example embodiments, there is no limitation on the number of plasma injectors that may be used in series with the pilot circuit 210.

In one example embodiment, the primary over-voltage protection circuit 208 is a Metal Oxide Varistor (MOV). The MOV of the primary over voltage protection circuit 208 starts accumulating the energy from the power transmission line 206 when the voltage across the capacitor bank 202 reaches a threshold voltage. In an example embodiment of the invention, the threshold voltage is based on the rated capacity of the capacitor bank 204. The capacitor bank 204 may get damaged if it is subjected to voltages higher than the threshold voltage.

The MOV can accumulate energy up to its rated capacity. In case the energy absorbed by the MOV is high enough to cause MOV damage or failure, a current transformer monitoring MOV current (not shown in the figure), a microcontroller (not shown in the figure), a ground based logic device (not shown in the figure), or a current transformer monitoring line current from the power transmission line 206 (not shown in the figure) may send a signal to a pilot circuit triggering circuit 216. The pilot circuit triggering circuit 216 triggers the pilot circuit 210 and thus bridges the pilot circuit 210. In one example embodiment, the pilot circuit triggering circuit 216 is an electrical and/or optical signal generator and the pilot circuit 210 is a power electronics device, such as a thyristor, diode, or an IGBT, for example. In another example embodiment, the pilot circuit triggering circuit 216 may include a charged capacitor and/or a pulse transformer which will provide a very high-magnitude voltage impulse to the pilot circuit 210, causing the pilot circuit 210 to dielectrically break down. In yet another example embodiment, the pilot circuit triggering circuit 216 may include a charged capacitor. In this embodiment, a stored energy of the charged capacitor is discharged close to a plastic (or other material) component to create plasma and the plasma is then forced in the pilot circuit 210 to dielectrically break down the pilot circuit 210. Subsequently, the current starts to flow through the pilot circuit 210. As a result, the pilot circuit 210 bypasses the primary over-voltage protection circuit 208 and protects the MOV and the capacitor bank 204. As soon as the pilot circuit 210 breaks down, the capacitor bank 204 starts discharging through the pilot circuit 210.

Further, referring FIG. 2, a current flowing through pilot circuit 210 due to the discharging of the capacitor bank 204 and the fault current in the power transmission line 206 may pass through the plasma injectors 214a and 214b. The plasma injectors 214a and 214b may contain a material that generates partially or fully ionized plasma when this current flows through them. The plasma generated by plasma injectors 214a and 214b is accelerated across the main commutation gap 212. In an example embodiment of the invention, the main commutation gap 212 is an air gap or a vacuum gap or a gap with another dielectric gas such as SF$_6$. The plasma generated from the plasma injectors 214a and 214b may dielectrically break down the main commutation gap 212 or completely bridge the main commutation gap 212 and thus make it conductive. As a result, the current (due to the capacitor bank 204 discharge and the fault current in the power transmission line 206) in the capacitor bank protection circuit 202 is shared between the pilot circuit 210 and the main commutation gap 212 based on relative impedance magnitudes of the paths leading to the pilot circuit 210 and the main commutation gap 212.

Further, in response to the increase in current from the capacitor bank 204, the plasma injectors 214a and 214b also generate a voltage across themselves, increasing the total impedance of the pilot circuit circuit. As a result, the current flowing through the pilot circuit 210 reduces, while simultaneously increasing through the main commutation gap 212. The reduction in the flow of the current from the pilot circuit 210 reduces possible damage to the pilot circuit 210 and associated components, such as thyristors. In example embodiments, the alternative path of the current (i.e., main commutation gap 212) allows the use of the lower current duty components in the pilot circuit 210 circuitry and thus reduces the associated cost and complex design requirements of the components. Further, the reduced amount of current and or the reduced duration of current flowing through the pilot circuit 210 helps provide a fast recovery of the pilot circuit 210 and improves the reliability of the capacitor bank protection circuit 202.

In one example embodiment, the impedances in the circuit are also designed to redirect most or all of the current through the main commutation gap 212. The impedance in the pilot circuit 210 circuit may be controlled at least in part by a pilot quenching component 218. The pilot quenching component 218 may include various electrical components such as metal oxide varistors, inductors, capacitors, plasma injectors, resistors, and/or air gaps to create linear and non-linear impedance in series with the pilot circuit 210. Because the main commutation gap 212 may be in the form of an arc with non-sinusoidal and non-linear voltages ranging from 500 Volts to 5000 Volts peak, it is beneficial to produce a combination of linear and non-linear impedance in the circuit of the pilot circuit 210. The non-linear impedance may lead to reliable commutation of the current from the circuit of the pilot circuit 210 to the main commutation gap 212. The linear and non linear impedances in the circuit of the pilot circuit 210 may also increase the voltage in the circuit of the pilot circuit 210 relative to that of the main commutation gap 212, and thus force most or all of the current to flow through the main commutation gap 212.

In one example embodiment, the capacitor protection circuit 202 may further include discharge damping and current limiting equipment 220 to dampen a portion of the high amount of energy generated due to the discharge defects (e.g., due to the fault currents and discharging of the capacitor bank) that may occur in the event of faults in the power transmission line 206. The damping capacity of the discharge damping and current limiting equipment 220 is based on its rated capacity.

FIG. 3 is a flowchart illustrating one example of a method 300 for discharging a capacitor bank. Provided is a flow chart illustrating an example of discharging the capacitor bank connected in parallel electrical communication with a power transmission line.

The example method begins at block 302. At block 302, a current is delivered through a pilot circuit, which is in a parallel connection with the capacitor bank. The pilot circuit may include a small air gap, a vacuum gap, a gap using a gas(. e.g., SF$_6$), a power-electronics based device, such as a thyristor, or any other type of high dielectric and high voltage triggered bypass device. In an embodiment of the example method 300, the current consists of a discharge current from the capacitor bank and a fault current in the power transmission line. The current is delivered through the pilot circuit in response to a pilot triggering circuitry that causes the pilot circuit to change from non-conducting to conducting. In an embodiment of the example method 300, a pilot circuit plasma injector energized through a current transformer monitoring MOV current, or a current transformer monitoring line current, may trigger the pilot circuit. Further, a primary over-voltage protection circuit may also be provided in a parallel connection with the capacitor bank to protect the capacitor bank during and after a fault in the power transmission line.

Block 302 is followed by block 304, in which the pilot circuit current is delivered through one or more plasma injectors. The plasma injectors are provided in a series connection with the pilot circuit. In an embodiment of the example method 300, the plasma injectors generate ionized plasma in response to the current flow. The plasma generated by plasma injectors is accelerated across a main commutation gap, which may include an air gap or a vacuum gap or a gap across a dielectric gas such as SF$_6$. The main commutation gap is connected in parallel with the pilot circuit. The ionized plasma may dielectrically break down the main commutation gap or completely bridge the main commutation gap and thus make it conductive.

Following block 304 is block 306, in which impedance is increased in series with the pilot circuit. In an embodiment of the example method 300, the impedance in the pilot circuit circuit may be controlled by a pilot quenching component connected in series with the pilot circuit. The pilot quenching component or components may include various electrical components such as metal oxide varistors, air gaps, inductors, capacitors, and resistors to create linear and non-linear resistance in the circuit of the pilot circuit. In addition, current flowing through the plasma injector(s) may create a non-linear impedance similar to an air gap, utilizing the plasma injectors in a double-function.

Block 306 is followed by block 308, in which the flow of the current is increased through the main commutation gap and simultaneously decreased through the pilot circuit. The increase in the flow of current in the main commutation gap is due to an increase in impedance in series with the pilot circuit. In an embodiment of the example method 300, the pilot quenching component may, increase the voltage of the pilot circuit circuit and that may subsequently force the current to increase through the main commutation gap and simultaneously decreases through the pilot circuit.

Many modifications and other embodiments of the exemplary descriptions set forth herein to which these descriptions pertain will come to mind having the benefit of the teachings presented in the foregoing descriptions and the associated drawings. Thus, it will be appreciated the invention may be embodied in many forms and should not be limited to the exemplary embodiments described above. Therefore, it is to be understood that the invention is not to be limited to the specific embodiments disclosed and that the modification and other embodiments are intended to be included within the scope of the appended claims. Although specific terms are employed herein, they are used in a generic and descriptive sense only and not for purposes of limitation.

The claimed invention is:

1. A capacitor bank protection circuit, comprising:
   at least one capacitor bank;
   at least one pilot circuit in parallel electrical communication with the at least one capacitor bank;
   at least one main commutation gap in parallel electrical communication with the at least one pilot circuit and the at least one capacitor bank; and
   at least one plasma injector in series electrical communication with the at least one pilot circuit and operable to provide plasma across at least a portion of the at least one main commutation gap when at least partially ionized, thereby making conductive at least one main commutation gap.

2. The capacitor bank protection circuit of claim 1, wherein the at least one pilot circuit comprises at least one of a power electronics device or a pilot circuit plasma injector.

3. The capacitor bank protection circuit of claim 1, further comprising pilot triggering circuitry in electrical communication with the at least one pilot circuit and operable to dielectrically break down the at least one pilot circuit.

4. The capacitor bank protection circuit of claim 3, wherein the pilot triggering circuitry is triggered by current through at least one of a primary over-voltage protection circuit in parallel electrical communication with the at least one capacitor bank, a ground-based signal, a transmission line current, or a capacitor bank voltage signal.

5. The capacitor bank protection circuit of claim 1, wherein the at least one pilot circuit further comprises pilot quenching circuitry operable to generate linear impedance and non-linear impedance in series with the at least one pilot circuit responsive at least partially to current flowing therethrough.

6. The capacitor bank protection circuit of claim 5, wherein the pilot quenching circuitry comprises at least one of a metal oxide varistor, a linear or non-linear resistor, an inductor, a capacitor, a transformer, an air gap, or a plasma injector.

7. The capacitor bank protection circuit of claim 1, further comprising a primary over-voltage protection circuit in parallel electrical communication with the at least one capacitor bank.

8. The capacitor bank protection circuit of claim 7, wherein the primary over-voltage protection circuit is operable to energize the pilot circuit to dielectrically break down the at least one pilot circuit.

9. The capacitor bank protection circuit of claim 7, wherein the primary over-voltage protection circuit comprises at least one metal oxide varistor.

10. A method for discharging a capacitor bank, comprising:
    delivering current through a pilot circuit in parallel electrical communication with the capacitor bank; and
    delivering current through at least one plasma injector in series electrical communication with the pilot circuit, wherein the at least one plasma injector is operable to dielectrically break down a main commutation gap in parallel electrical communication with the pilot circuit;
    increasing impedance in series with the pilot circuit; and
    increasing current flow through the main commutation gap and decreasing current flow through the pilot circuit responsive at least partially to increasing the impedance in series with the pilot circuit.

11. The method of claim 10, wherein delivering current through the pilot circuit comprises delivering current through at least one pilot circuit plasma injector to dielectrically break down the pilot circuit.

12. The method of claim 10, wherein delivering current through the pilot circuit comprises using a high-magnitude voltage impulse to dielectrically break down the pilot circuit.

13. The method of claim 10, wherein increasing impedance in series with the pilot circuit comprises delivering current through pilot quenching circuitry in series electrical communication with the pilot circuit.

14. The method of claim 10, wherein increasing impedance in series with the pilot circuit comprises increasing linear impedance and/or non-linear impedance.

15. The method of claim 10, wherein increasing impedance in series with the pilot circuit comprises delivering current through at least one plasma injector that injects plasma at least partially across the main commutation gap.

16. The method of claim 10, wherein delivering current through the pilot circuit is performed responsive at least partially to pilot triggering circuitry energizing the pilot circuit.

17. A power transmission line, comprising:
    a power source;
    a load in electrical communication with the power source by the power transmission line;
    at least one capacitor bank in series electrical communication with the load, the power transmission line, and the power source;
    at least one pilot circuit in parallel electrical communication with the at least one capacitor bank;
    at least one main commutation gap in parallel electrical communication with the at least one pilot circuit and the at least one capacitor bank; and
    at least one plasma injector in series electrical communication with the at least one pilot circuit and operable to provide plasma across at least a portion of the at least one main commutation gap when at least partially ionized, thereby making conductive at least one main commutation gap.

18. The power transmission line of claim 17, further comprising pilot quenching circuitry operable to generate linear impedance and non-linear impedance in series with the at least one pilot circuit responsive to current flowing therethrough, wherein increased impedance of the pilot circuit circuitry increases current flow through the main commutation gap and decreases current flow through the pilot circuit.

19. The power transmission line of claim 17, further comprising a primary over-voltage protection circuit in parallel electrical communication with the at least one capacitor bank, wherein the primary over-voltage protection circuit is operable to cause current to flow through at least one of the pilot circuit or the main commutation gap.

20. The power transmission line of claim 17, further comprising pilot triggering circuitry in electrical communication with the pilot circuit and operable to dielectrically break down the at least one pilot circuit, wherein the pilot triggering circuitry is triggered by delivering current through at least one of a primary over-voltage protection circuit in parallel electrical communication with the at least one capacitor bank, a ground-based signal, voltage across the at least one capacitor bank, or delivering current through the power transmission line.

* * * * *